2,954,299

PROCESS OF PREPARING A CHIFFON DESSERT PRODUCT AND THE RESULTING PRODUCT

Adolph S. Clausi, Battle Creek, Mich., and James L. Common, Briarcliff, and Hazel M. Horti, Bethpage, N.Y., assignors to General Foods Corporation, White Plains, N.Y., a corporation of Delaware No Drawing. Filed July 10, 1958, Ser. No. 747,588

9 Claims. (Cl. 99—139)

This invention relates to a chiffon food product suitable for use as a pie filling or similar dessert. More particularly, the invention is concerned with a whipping composition and the stable chiffon of superior texture produced upon whipping same in a sugar solution. This is a continuation-in-part of U.S. Serial No. 521,884, filed July 13, 1955, now abandoned.

The usual manner of preparation of a chiffon at home or in the bakery calls for a careful and to some extent skillfully prepared recipe wherein a pudding, gelatin dessert or custard is folded into a stiff meringue, the meringue having been prepared by whipping egg white and sugar syrup. Such a procedure is time consuming, requires an undue amount of skill by the housewife or baker, and does not assure consistent results. The meringue usually decreases in volume when the other incredients are folded into it. Also, the product develops a tough, unpalatable, rubbery skin if left uncovered for a few days. Consequently, such preparations are inconvenient to prepare, do not reliably provide the texture of a chiffon and have undesirable storage properties.

The texture of chiffon for flavored dessert products like pie fillings should be characterized by a high degree of overrun, good peaking evidencing stability, uniformity and fineness of cells. Hence, a chiffon is to be distinguished from other whipped food products such as marshmallows and candy cremes having much higher density and a heavier gummy texture. Thus, a chiffon is a low solids whip, say in the order of 30-40% solids whereas the latter class of whips are of much higher solids content in the order of say 70% solids. Due to the delicate nature of the foam system in a chiffon problems and product requirements distinctly different from those of high solids whips are encountered. That this is true is borne out by attempts to translate mix formulations suitable for use in preparing high solids whips to use in preparing a low solids chiffon-type whip. To illustrate, various gummy materials such as Irish moss, cellulose ethers and esters like carboxymethyl cellulose, algin derivatives like sodium alginate and the like, employed to stabilize high solids sugar whips, impart in the case of low solids chiffon whips an objectionable sticky, cohesive texture. While this sticky cohesive texture is not undesirable in low overrun whips such as marshmallow and candy cremes, it is not desirable in chiffons where the properties of uniform and clean cleavage of product when cut into wedges having in cross-section a delicate, finely and uniformly celled texture are important. Low solids gelatin whips are coarse and non-uniform in texture and provide only a limited degree of overrun such that a light and delicate chiffon is not achieved; furthermore, in low solids sugar whips, gelatin will separate and collect as an objectionable gelled layer at the bottom of the whip.

When auxiliary whipping agents are employed, e.g., partially degraded soy protein, in combination with a colloid like gelatin, much higher overruns and a fine texture can be achieved but separation of the gelatin component of the low solids whip and its collection at the bottom of the whip remain a problem. This is attributable to the slow rate of set of the gelatin and its tendency to separate into a continuous phase distinct from the soy foam. This deficency can be partially corrected by employing a thickening agent—gelatinized starch—but even when gelatinized starch is employed, prolonged and strenuous whipping is required before separation will be avoided.

It would clearly be advantageous to employ a composition which could be readily reconstituted in water or other aqueous liquid and which would not require a number of separate careful steps in preparing chiffons. Unfortunately, the usual whipping agent employed in preparing a chiffon, viz., egg white, cannot be readily whipped in the presence of other desirable ingredients of the chiffon. These latter ingredients either increase the whipping time required or else the egg white does not sufficiently whip in their presence to provide the desired overrun and texture. It would be desirable to provide a composition capable of producing a chiffon having all of the foregoing desired texture characteristics and yet which can be quickly whipped with a minimum of effort and is substantially free of separation.

According to the present invention it has been found that an improved chiffon can be obtained by employing partially degraded soy protein, gelatin and a phosphorous containing compound selected from the class phosphates, phytates, their acids and acid salts in combination as a composition to be whipped with a sugar solution. It has been found that the aforesaid class of phosphorous-containing compounds act to set the foam produced upon whipping the partially degraded soy protein and the gelatin in acid media such as that provided by employing organic food acids like citric acid, tartaric acid, adipic acid, fumaric acid, malic acid and the acid salts of the alkali metals with such organic food acids, for example, the citrates, tartrates and malates of potassium, sodium and ammonium employed, such salts and acids being employed singly or in combination as an edible organic acid substance for imparting a fruit-flavored or tarty taste. The pH of a mix solution using such an acid media would range below 7.0 and for most fruit-flavored products having a tarty character would have a pH range anywhere from 2.9 to 4.4 depending upon the acid and/or the salt and levels thereof chosen for tartness; in mix solutions for chocolate flavored dessert products a pH in the neighborhood of 6.0-6.9 is preferred.

The precise mechanism or explanation for this setting of the foam is not known although one explanation that has been offered is the precipitating effect of the phosphorous-containing compounds on the proteinaceous materials present. It appears that in addition to the denaturation which normally occurs on whipping the protein materials there is an additional stabilizing effect provided by the phosphates and the phytates which increases whipping efficiency to a high degree and also accelerate the setting of the foam. In addition, a low solids whip of extremely high volume is obtained. As distinguished from cases where the whipping composition does not employ a phosphate or a phytate, the composition of the present invention produces a much higher volume, low solids whip quickly with little or no separation of the gelatin. When some slight separation is encountered this can be eliminated by a slight excess in whipping time.

Where it is necessary for separation to be avoided entirely while at the same time practicing still further reduced whipping times, it has been found that dried pregelatinized starch provides good peaking and eliminates separation problems entirely. It appears that unlike cooked starch, the dried pregelatinized starch (although already gelatinized) is not fully rehydrated upon addition of the composition to a sugar solution and has an affinity for water. This affinity of the dried pregelatinized starch for water appears to reduce the level of free available water during whipping and thereby controls overrun preventing excessively high volume whips and also stabilizes the foam system after whipping and before the gelatin has set to further eliminate danger of separation or layering of the chiffon prior to gelation, despite the use of very short whipping periods.

The aforesaid whipping and stabilizing aids are broadly of two types: alkali metal phosphates including sodium, potassium, lithium, rubidium, cesium and ammonium; and the alkali and alkaline earth metal phytates, i.e., the hexaphosphoric ester salts of inositol. Examples of the alkali metal phosphates are sodium hexametaphosphate, sodium metaphosphate, potassium metaphosphate, sodium polymetaphosphate, potassium tripolyphosphate, sodium trimetaphosphate, sodium tetrametaphosphate, potassium polymetaphosphate, disodium orthophosphate, diammonium orthophosphate, ammonium orthophosphate, sodium tripolyphosphate, tetrasodium pyrophosphate, and tetrapotassium pyrophosphate; of these the phosphate glasses sodium metaphosphate (Graham's salt) and sodium hexametaphosphate are most preferred because of their ability to produce the greatest overrun and chiffons which retain semi-glossy, stiff peaks after the chiffon sets. Representative of the phytates are sodium phytate and calcium phytate.

The partially hydrolyzed soy protein for use in the present invention is to be distinguished from substantially unhydrolyzed soy albumin which does not have the ability to develop a fine uniform foam in the present system. The soy protein can be hydrolyzed by enzymatic, acidic or alkaline techniques. For the purposes of the present invention soy protein which has been enzymatically hydrolyzed with pepsin from 10–18% is preferred, although trypsin and pancreatin have been successfully employed in place of pepsin. In this connection, percent hydrolysis is the percent of total nitrogen which is amino nitrogen. Total nitrogen is determined by the Kjeldahl method and amino nitrogen is determined by the method described in David M. Breenberg's "Amino Acids and Proteins," Charles C. Thomas, Springfield, Illinois (1951), on pages 80, 81 and 246. The analysis of a typical partially degraded soy protein which is employed is as follows:

|  | Percent |
| --- | --- |
| Total nitrogen | 9.9 |
| Amino nitrogen | 1.1 |
| Ash | 13.4 |
| Moisture | 4.6 |
| pH (1% solution) | 5.5 |

Improvements result in the chiffon system as the level of partially degraded soy protein employed is increased, although above a certain level the partially degraded soy protein will no longer produce any practical advantage either in whipping time or texture. As the level of gelatin employed is increased over that required for gelling the chiffon there is little if any increase in foam volume and excessive quantities of gelatin may provide an undesirable rubbery texture to the final product. The ratio of gelatin to partially degraded soy protein will depend to some extent upon the bloom of the gelatin, lesser amounts of high bloom gelatin being required than in the case of low bloom gelatin. Rehydration of the dried pregelatinized starch is also necessary otherwise the sugar and the gelatin in the chiffon system will tend to separate before the gelatin has gelled. The pregelatinized starch can be either the tuber or cereal type. However, of the two, tuber type starches such as potato and tapioca are preferred because of their stability to the development of off flavors during storage. Broadly, 2.5–7.5 parts by weight gelatin to .5–1.5 parts by weight partially degraded soy protein and 3.0–11.0 parts by weight pregelatinized starch produce an acceptable whipping material for the present chiffon.

The amount of phosphate or phytate which is employed to reduce the whipping period required to develop the desired chiffon texture and increased degree of overrun can be varied from 1 to 20% by weight of the partially degraded soy protein, the efficiency of the aforementioned whipping material improving as the level of phosphate or phytate increases. In the case of the phosphate glass sodium hexametaphosphate (Calgon) it has been found that increasing the level of the hexametaphosphate from 1% to 20% by weight of the partially degraded soy protein produces increasingly improved results; 20% sodium hexametaphosphate produces an optimal degree of enhancement to the whipping material and for this reason this level of this phosphate glass is preferred.

The sweetening agent employed is preferably sucrose, although glucose, levulose, lactose, fructose, maltose, and saccharide mixtures, such as dry corn syrup solids, may also be employed. As the level of sugar increases, the viscosity of the solution increases and foam volume increases, however, the level of sugar used is also based upon sweetness desired. For ease of mixing it is preferred that part of the sugar be included in the dry mix and that another part be added separately after the first part has been dissolved in the aqueous medium and whipped for a part of the whipping period. This substantially reduces the effort required on the part of the housewife. In the aforementioned ratio of parts by weight of the dry mix ingredients, 100–150 parts by weight of sugar are preferably employed therewith in the over-all chiffon system.

The foregoing range of mix ingredients is calculated for addition to approximately 1 cup of water; that is approximately 237 parts by weight, the chiffon dessert prepared from this proportion of ingredients will generally have a solids content ranging from about 30–40%. Hence, for this low solids chiffon the solids will range in the following parts by weight:

0.5–1.5 parts partially degraded soy protein
2.5–7.5 parts gelatin
3.0–11.0 parts dried pregelatinized starch
100–150 parts sucrose
0.005–0.30 part alkali metal phosphate or phytate The ratio in which the ingredients are employed in the present chiffon mix as well as the function of such ingredients is apparent by examination of the following table. A base mix was prepared including 72.27 parts by weight of sucrose, 0.23 part by weight of sodium chloride, 0.20 part by weight of strawberry color, 1.00 part by weight of strawberry flavor, and 1.00 part by weight of citric acid to total 74.70 parts by weight. To 74.70 grams of the base mix were added hydrolyzed soy protein, pregelatinized starch, gelatin and sodium hexametaphosphate separately and in various combinations as indicated in the table. The amounts in which these materials were added to the base mix are 1.03 grams of partially degraded soy protein, 3.60 grams of gelatin, 5.50 grams of pregelatinized potato starch, and 0.22 gram of sodium hexametaphosphate. In each case the mix was dissolved in ½ cup of boiling water to which was then added ½ cup of cool tap water. The mix solution in each case having a pH of about 3.3 was then beaten with an electric mixer for ½ of the period indicated in the table, 67.0 additional grams of sucrose were added to the whip and the product was whipped with an electric mixer for the remainder of the indicated whipping period. The volume of the chiffon was determined and the chiffon was then placed in a pie plate and chilled in a refrigerator for about 90 minutes.

| Ingredients Employed in Addition to Master Mix | | Whipping Periods | | | | | |
|---|---|---|---|---|---|---|---|
| | | 2 Minutes | | 4 Minutes | | 8 Minutes | |
| | | Volumes | Comment | Volume | Comment | Volume | Comment |
| Series: 1 | Partially degraded soy protein plus dried pregelatinized starch | 1,260 | Fine texture, no set | 1,480 | Fine texture, no set | 1,560 | Fine texture, no set. |
| 2 | Gelatin plus dried pregelatinized starch | 560 | Coarse textured foamy rubbery gel at top; separation of gel at bottom of layer. | 640 | Coarse textured foamy rubbery gel at top; separation of gelatin layer at bottom. | 950 | Slightly coarse textured foamy rubbery gel at top; some separation. |
| 3 | Partially degraded soy protein plus gelatin. | 1,800 | Fine texture, separation. | 1,800 | Fine texture, separation. | 1,800 | Fine texture, separation. |
| 4 | Partially degraded soy protein plus gelatin plus dried pregelatinized starch. | 1,340 | Slightly coarse textured chiffon, separation, no substantial peaks. | 1,540 | Fine chiffon, no separation, peaks. | 1,630 | Very fine chiffon, no separation, peaks. |
| 5 | Partially degraded soy protein plus gelatin plus sodium hexametaphosphate. | 2,100 | Fine chiffon texture, slight separation. | 2,350 | Fine chiffon texture, slight separation. | 2,450 | Fine chiffon texture, no separation. |
| 6 | Partially degraded soy protein plus gelatin plus sodium hexametaphosphate plus dried gelatinized starch. | 1,480 | Fine chiffon, no separation, peaks. | 1,500 | Finer chiffon, no separation, peaks. | 1,600 | Finest chiffon, no separation, peaks. |

From the foregoing table it will be noted the partially degraded soy protein and the gelatin in combination with the sodium hexametaphosphates (series 5) provides an unusually high overrun chiffon of the desired chiffon texture in a greatly reduced whipping period, that is in the order of two minutes. In comparison to series 3 where the phosphate is not employed it will be noted that the problem of separation was greatly reduced and was eliminated upon whipping for eight minutes. In this connection it will be noted that for series 3 with eight minutes of whipping separation was still noticed, illustrating the contribution of the phosphate. Thus, the phosphate appears to induce a partial set of the whipped proteinaceous materials to reduce separation; in addition a much higher foam volume is obtained for various whipping periods and the period of whipping required to achieve a high overrun is substantially reduced.

Although the chiffons of series 5 had a very acceptable chiffon texture, that is they could be cut readily into wedges providing a fine, delicate uniformly celled product, the contribution of dried pregelatinized starch to the combination of series 5, exemplified by series 6, is a chiffon texture wherein the ingredients do not separate prior to gelation of the system. Hence, series 6 illustrates the property of dried pregelatinized starch in combination with the composition of series 5, to wit, production of a chiffon which does not separate and which also peaks with only a short whipping period required. As indicated above this appears to be due to the ability of the dried starch to assist the phosphate in eliminating separation problems.

EXAMPLE 1

*Strawberry chiffon dry mix*

| | Gms. |
|---|---|
| Sucrose | 60.67 |
| Pregelatinized potato starch | 10.50 |
| Dry corn syrup solids 24 DE (24 dextrose equivalent) | 7.50 |
| Gelatin | 2.50 |
| Partially degraded soy protein including 10% sodium hexametaphosphate | 1.25 |
| Citric acid | 1.20 |
| Strawberry flavor | 1.00 |
| Salt (NaCl) | .23 |
| Strawberry color | .20 |
| Total | 85.05 |

The above dry mix is placed in a small mixing bowl (1½ qt. size). One-half cup of boiling water (4 oz.) is added and stirred thoroughly to dissolve the gelatin in the mix. Thereafter, ⅓ cup of sugar (sucrose) is stirred into the mix solution (of about pH 3.3) and then ½ cup of cold water is added to lower the temperature of the stabilizing agent, gelatin, so that it will set effectively. The mix solution is then placed in a refrigerator for 15 minutes to further cool the same. Thereafter the solution is machine whipped for two minutes until it develops relatively stiff peaks. Thereafter the resulting chiffon is poured into a pie shell (8 or 9 inches) and placed in a refrigerator until set (about two hours).

As an alternative to a machine whip recipe for chiffon preparations, a hand whip method may be employed. In this method the dry mix is placed in the small mixing bowl and ½ cup boiling water is stirred into the mix as before to dissolve the gelatin. Thereafter ½ cup cold water is stirred into the mix solution so that the gelatin will approach its setting temperature. The mix solution is then vigorously beaten for one minute with a rotary egg beater, after which ⅓ cup of sugar is blanded with the whip until smooth (approximately 2 minutes). The resulting chiffon is then poured into the pie shell and refrigerated until set (about 2 hours). In this recipe the sugar may be added at any period, but it is preferred to vigorously beat the mix solution for a short period and interrupt this beating with the sugar addition so as to reduce the effort required.

EXAMPLE 2

*Strawberry chiffon dry mix*

| | Gms. |
|---|---|
| Sugar | 55.6 |
| Pregelatinized potato starch | 8.0 |
| Dry corn syrup solids 24 DE (24 dextrose equivalent) | 7.50 |
| Partially hydrolyzed soy protein including 10% sodium hexametaphosphate | 1.25 |
| Citric acid | 1.20 |
| Strawberry flavor | 1.00 |
| Salt (sodium chloride) | 0.23 |
| Strawberry color | .20 |
| Freeze dried gelatin (50% dextrose) | 10.00 |
| Total | 84.98 |

One cup of cold water is placed in a small mixing bowl (1½ qt. size) and the mix was added thereto to provide a mix solution of about pH 3.3. For a machine whip the dry mix was added together with ⅓ cup sugar and beaten at a high speed in a mechanical mixer for 3 minutes. The resulting chiffon was then poured into a pie shell and refrigerated until set (about 45 minutes). It will be noted that the recipe requirements are simpler in the case of this second dry mix employing the cold water soluble gelatin and the pregelatinized starch. The temperature differential was substantially reduced such that the setting characteristics of the stabilizing agent, gelatin, became effective without the necessity for a preliminary chilling of the mix solution prior to whipping. Also, the resulting chiffon sets in a relatively shorter period of time.

It will be understood that while the invention has been described in part by means of specific examples reference should be had to the appended claims for a definition of the scope of the invention.

What is claimed is:

1. In the preparation of a chiffon dessert product the improvement which comprises the use in combination in an edible organic acid solution of pH 2.9–4.4 of partially degraded soy protein, gelatin, and a phosphorous-containing compound selected from the class phosphates and phytates, their acids and their acid salts.

2. In the preparation of a chiffon dessert product the improvement which comprises the use in combination in an edible organic acid solution of pH 2.9–4.4 of partially degraded soy protein, gelatin, dried pregelatinized starch, and a phosphorous-containing compound selected from the class phosphates and phytates, their acids and their acid salts.

3. A dry mix for use in the preparation of a chiffon dessert product which comprises in combination an edible organic acid substance adapted to provide a mix solution having a pH of 2.9–4.4, partially degraded soy protein, gelatin, dried pregelatinized starch, and a phosphorous-containing compound selected from the class phosphates and phytates and their acid salts.

4. A dry mix for use in the preparation of a chiffon dessert product which comprises in combination an edible organic acid substance adapted to provide a mix solution having a pH of 2.9–4.4, partially degraded soy protein, gelatin, dried pregelatinized starch, and a phosphorous-containing compound selected from the class phosphates and phytates and their acid salts.

5. A dry mix for use in the preparation of a chiffon dessert product which comprises in combination an edible organic acid substance adapted to provide a mix solution having a pH of 2.9–4.4, a sugar, partially degraded soy protein, gelatin, dried pregelatinized starch, and a phosphorous-containing compound selected from the class phosphates and phytates and their acid salts.

6. A dry mix for use in the preparation of a chiffon dessert product which comprises in combination an edible organic acid substance adapted to provide a mix solution having a pH of 2.9–4.4, a sugar, partially degraded soy protein, gelatin, dried pregelatinized starch, and a phosphorous-containing compound selected from the class phosphates and phytates and their acid salts.

7. A dry mix according to claim 6 wherein the acid substance is adapted to provide a mix solution which has the following proportions of parts by weight:

0.5–1.5 parts partially degraded soy protein
2.5–7.5 parts gelatin
3.0–11.0 parts dried pregelatinized starch
100–150 parts sucrose
0.005–0.30 part of said phosphorous-containing compound 8. A chiffon dessert product having a solids content ranging from about 30%–40% and prepared by whipping a mix solution of sugar, partially degraded soy protein, gelatin, and a phosphorous-containing substance selected from the class phosphates and phytates, their acids and their acid salts, said mix solution having an acidic pH ranging from 2.9–4.4.

9. A chiffon dessert product according to claim 12 wherein the mix solution has the following proportions of parts by weight:

0.5–1.5 parts partially degraded soy protein
2.5–7.5 parts gelatin
3.0–11.0 parts dried pregelatinized starch
100–150 parts sucrose
0.005–0.30 part of said phosphorous-containing compound References Cited in the file of this patent

UNITED STATES PATENTS

| | | |
|---|---|---|
| 2,196,300 | Grettie | Apr. 9, 1940 |
| 2,444,241 | Beckel et al. | June 29, 1948 |
| 2,588,419 | Sevall et al. | Mar. 11, 1952 |
| 2,844,468 | Gunther | July 22, 1958 |

UNITED STATES PATENT OFFICE
CERTIFICATION OF CORRECTION

Patent No. 2,954,299 September 27, 1960

Adolph S. Clausi et al.

It is hereby certified that error appears in the above numbered patent requiring correction and that the said Letters Patent should read as corrected below.

Column 2, line 49, for "range" read -- ranging --; lines 51, 52 and 53, strike out "; in mix solutions for chocolate flavored dessert products a pH in the neighborhood of 6.0-6.9 is preferred"; column 8, line 26, for the claim reference numeral "12" read -- 8 --.

Signed and sealed this 20th day of June 1961.

(SEAL)
Attest:

ERNEST W. SWIDER
Attesting Officer

DAVID L. LADD
Commissioner of Patents